United States Patent
Keel

(10) Patent No.: US 9,550,141 B2
(45) Date of Patent: Jan. 24, 2017

(54) DEVICE FOR CLEANING CONTAMINATED AIR

(75) Inventor: Niklaus Keel, Effingen (CH)

(73) Assignee: TB-SAFETY GMBH, Effingen (CH)

( * ) Notice: Subject to any disclaimer, the term of this patent is extended or adjusted under 35 U.S.C. 154(b) by 462 days.

(21) Appl. No.: 14/009,982

(22) PCT Filed: Apr. 3, 2012

(86) PCT No.: PCT/IB2012/051633
§ 371 (c)(1),
(2), (4) Date: Oct. 4, 2013

(87) PCT Pub. No.: WO2012/137135
PCT Pub. Date: Oct. 11, 2012

(65) Prior Publication Data
US 2014/0026526 A1   Jan. 30, 2014

(30) Foreign Application Priority Data
Apr. 7, 2011   (CH) .......................................... 624/11

(51) Int. Cl.
| B01D 46/00 | (2006.01) |
| B01D 46/42 | (2006.01) |
| A62B 7/10 | (2006.01) |
| A62B 17/00 | (2006.01) |
| A62B 18/00 | (2006.01) |

(52) U.S. Cl.
CPC .............. *B01D 46/42* (2013.01); *A62B 7/10* (2013.01); *A62B 17/006* (2013.01); *A62B 18/006* (2013.01)

(58) Field of Classification Search
CPC ....... B01D 46/42; B01D 46/2411; A62B 7/10; A62B 17/06; A62B 18/06
See application file for complete search history.

(56) References Cited

U.S. PATENT DOCUMENTS

| 5,472,001 A | * | 12/1995 | Nicholson | ............... A24F 13/14 131/185 |
| 2009/0266361 A1 | | 10/2009 | Bilger et al. | |
| 2011/0094052 A1 | * | 4/2011 | Witter | ............... B01D 46/2411 15/347 |

FOREIGN PATENT DOCUMENTS

| EP | 0 558 147 | | 9/1993 | |
| GB | 2 209 474 | | 5/1989 | |
| GB | 2209474 A | * | 5/1989 | ........... A62B 18/006 |
| WO | WO 01/78839 | | 10/2001 | |

OTHER PUBLICATIONS

International Search Report issued by the European Patent Office in International Application PCT/IB2012/051633 on Jul. 18, 2013.

* cited by examiner

*Primary Examiner* — Jason M Greene
*Assistant Examiner* — Karla Hawkins
(74) *Attorney, Agent, or Firm* — Henry M. Feiereisen LLC

(57) ABSTRACT

A device for filtering contaminated air includes an air filter, an intake fan driven by an electric motor, a filter housing, to which the air filter can be fastened by means of a threaded connection, and a battery for driving the electric motor, wherein the intake fan has a guide blade and an impeller, and the intake fan is arranged in a chimney-shaped shell on the filter housing.

5 Claims, 3 Drawing Sheets

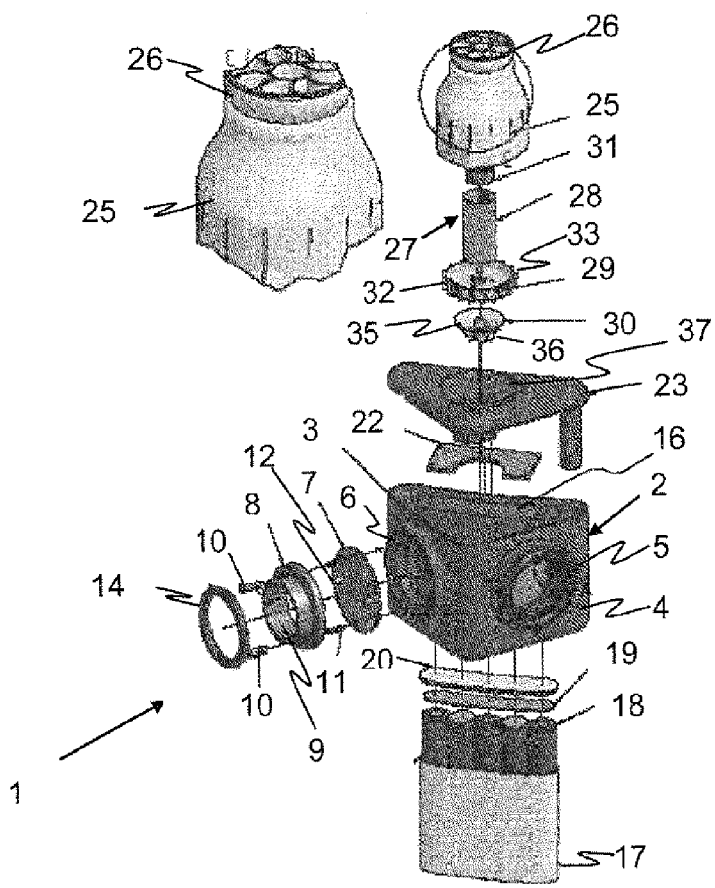
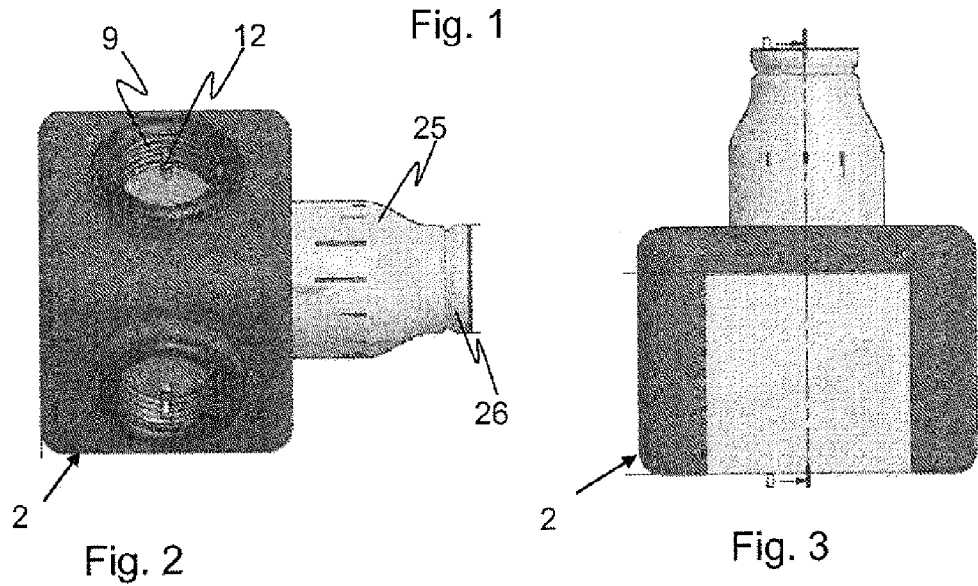
Fig. 1
Fig. 2
Fig. 3

DEVICE FOR CLEANING CONTAMINATED AIR

CROSS-REFERENCES TO RELATED APPLICATIONS

This application is the U.S. National Stage of International Application No. PCT/IB2012/051633, filed Apr. 3, 2012, which designated the United States and has been published as International Publication No. WO 2012/137135 and which claims the priority of Swiss Patent Application, Serial No. 00624/11, filed Apr. 7, 2011, pursuant to 35 U.S.C. 119(a)-(d).

BACKGROUND OF THE INVENTION

The invention relates to a device for cleaning contaminated air according to the preamble of patent claim 1.

STATE OF THE ART

Devices for filtering contaminated air are already known for some time and consist of an air filter and an adjoining intake fan to suction air into a protective suit. In the protective suit a valve is provided which opens at a predetermined overpressure so that the used air can be released from the protective suit. These devices have the disadvantage that the interior can be contaminated when screwing off the filters.

OBJECT OF THE INVENTION

It is an object of the invention to improve a device of the above-mentioned type so that a higher air flow rate is achieved and to the largest degree a thorough cleaning of the device is not required.

SUBJECT MATTER OF THE INVENTION

This object is solved by a device for filtering contaminated air including a filter, housing having a chimney-shaped sleeve; an air filter, fastenable to the filter housing by means of a threaded connection; an electromotor; a battery for driving the electromotor; and an intake fan having a guide vane and an impeller, and being arranged in the chimney-shaped sleeve.

The device according to the invention has the significant advantage that the construction of the intake fan with a guide blade, an impeller and a chimney shaped sleeve, results in a significantly higher suction power.

It is further advantageous when the impeller has a conical outer surface and arc-shaped impeller blades molded thereon, which impeller is enclosed by a funnel on the filter housing to achieve a higher negative pressure in the filter housing. In addition it has proven advantageous that the guide vane has a circular-cylindrical lateral surface with blades molded onto the lateral surface. Preferably, the entrance of the filter housing is provided with a flap, which can be actuated by a safety pin when screwing open the air filter. This results in air only being suctioned into the air housing when all filters are mounted correctly. Advantageously, the flap is provided with a resilient closure means to push the flap against the entrance opening of the housing. When the flap is provided with a magnet, and a hall element, which can be switched by the magnet, is provided on the filter housing, the electromotor of the intake fan can also only be switched on when all filters are mounted correctly. This also prevents the filter housing and the intake fan from becoming contaminated. Further, the filter housing is preferably configured cylindrical with a base surface of a right-angled, equilateral triangle to enable space efficient mounting of the filters. Further, advantageously a mechanical safety mechanism is provided which prevents that the interior of the device is contaminated when the filters are not screwed in.

BRIEF DESCRIPTION OF THE DRAWING

Further advantages of the invention become apparent from the dependent patent claims and from the following description in which the invention is explained in more detail by way of an exemplary embodiment schematically shown in the drawings. It is shown in:

FIG. 1 an exploded view of a cleaning device,
FIG. 2 a perspective view of the cleaning device without filter,
FIG. 3 a rear side perspective view of the cleaning device,
FIG. 4 a cross section through the plane D-D of the FIG. 3,
FIG. 5 a further perspective view of the cleaning device,
FIG. 6 a top view of the cleaning device without filter,
FIG. 7 a detail of the threading for fastening a filter,
FIG. 8 a perspective view of another embodiment of the cleaning device with four filters,
FIG. 9 a top view onto the cleaning device of FIG. 8 without filter, and
FIG. 10 a detail view of the display on the cleaning device of the FIGS. 8 and 9.

If not indicated otherwise, the same reference numerals are used for the same elements in the drawings.

DETAILED DESCRIPTION OF PREFERRED EMBODIMENTS

Figures 4, 5:
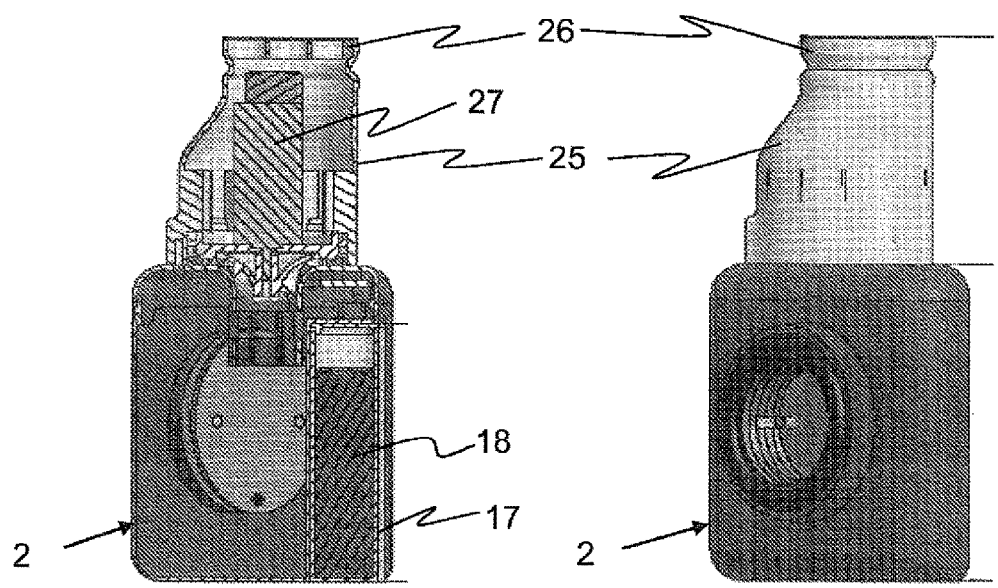
Figures 6, 7:
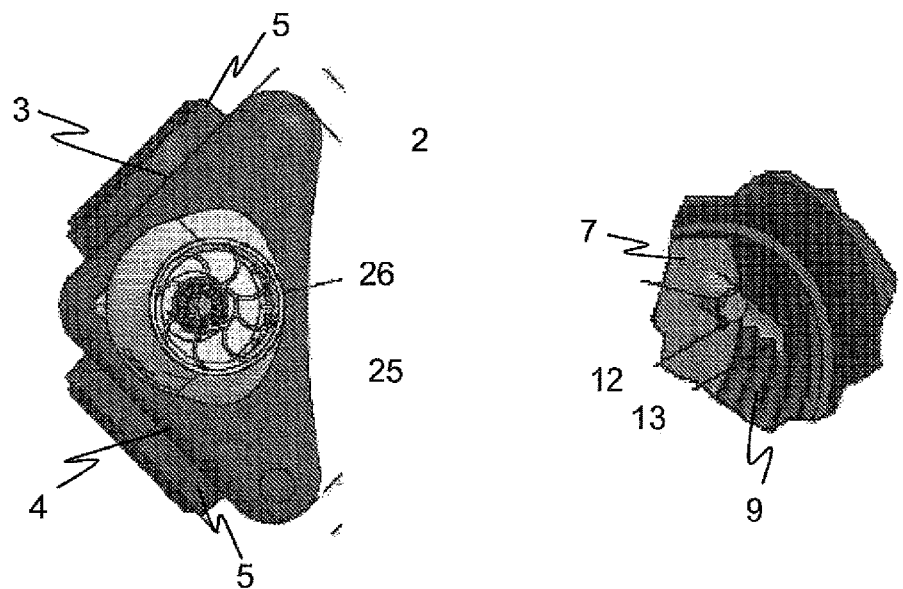

In FIG. 1 a cleaning device 1 is shown in exploded view and in FIGS. 2 to 7 different details are shown in perspective view, in cross section and in a detail view. The cleaning device 1 has a cylindrical filter housing 2 with a base surface of a right-angled triangle with two identical sides. In each of the surfaces 3 and 4 of the filter housing which form a right angle with one another, a respective circular-cylindrical flange 5 is molded which has an inner border 6. A circular plate 7 with a smaller diameter than the flange 5 is provided so that a small circular distance is created between the border of the plate 7 and the flange 5. Further provided is a flange 8 with an internal thread 9 which can be fastened in the flange 5 with a press fit. The distance between the flange 8 and the inner border 6 is determined by two sleeves 10. By means of tension spring 11 the plate 7, which serves as dust flap, is pulled against the internal thread 9. The diameter of the plate 7 is again greater than the internal diameter of the internal thread 9 so that the plate 7 seals dust tight against the internal thread 9. Further, two pins 12 are provided on the plate 7, which are each guided in a semi-cylindrical guide 13 in the internal thread 9 (see also FIG. 7). Between the flange 5 and the flange 8 an O-ring 14 is provided. On the bottom side of the filter housing 2 a slot 16a of a circular arc-shaped receptacle 16 is provided into which a correspondingly formed battery housing 17 with chargeable batteries 18 can be inserted. The batteries 18 are electrically coupled with each other via a circuit board 19. The battery housing 17 is further closed by a cover 20. Above the receptacle 16, a further circuit board 22 is arranged which is clamped between a cover 23 of the housing 2 and the receptacle 16. Above the cover 23 a chimney shaped sleeve 25 with rosette-like exit 26 is provided, which sleeve has a intake fan 27 with a small electromotor 28, a guide vane 29 and an impeller 30. Above the electromotor 28 an acoustic indicator 31 in the form of a buzzer or the like is arranged.

The guide vane 29 has a circular cylindrical lateral surface 32 with angled blades 33 molded thereon. Generally, an impeller is a propeller, which is enclosed by a ring-shaped or tube-shaped housing. The sheath causes a lowering of the air resistance at the propeller blades, which increases efficiency. The impeller 30 is configured with a conical outer surface 35 and arc-shaped impeller blades 36 molded thereon. In the cover 23, a funnel 37 is formed which encloses the impeller 30, resulting in a very strong suction performance of the blower 27.

Different types of filters can be screwed into the internal threads 9 of the two flanges 8, depending on the application. There are filters that are particularly suited for work in a nuclear plant, in a safety hospital or in a CBRN lab. Such filters are generally known and can for example be obtained from the company Avec Chem s.r.o. CZ-530 02 Pardubice.

Figure 8:
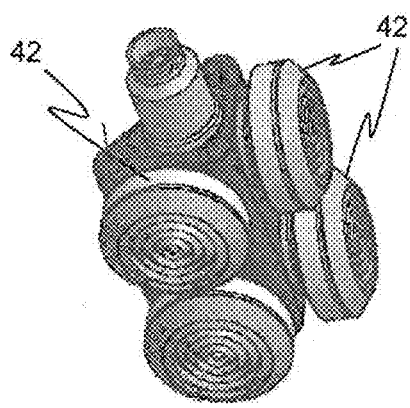

FIG. 8 shows a cleaning device 41, which is configured for four filters 42.

Figures 9, 10:
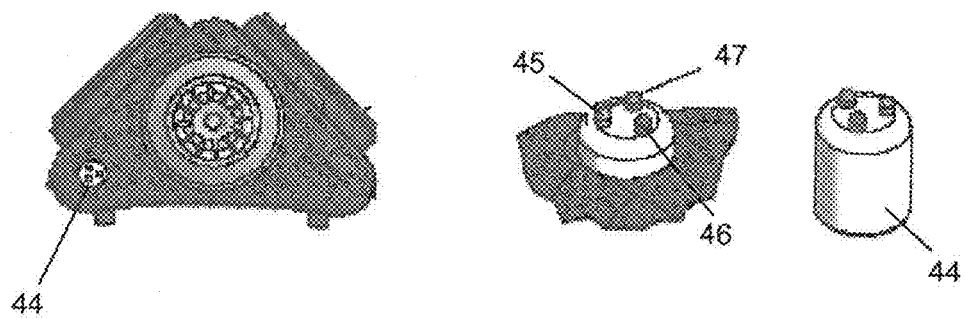

FIG. 9 shows the cleaning device 1 in a top view. Here, an optical warning device 44 with a light emitting diode 45 for displaying the charge state of the batteries 18, with a light emitting diode 46 for displaying the functionality of the screwed on filter, and a light emitting diode 47 for displaying the functionality of the blower is provided. A detail view of this warning device 44 can also be seen in FIG. 10.

The blower 27 has an air flow rate of up to 800 l/min using only an extremely small space. The core part of the blower is the impeller 30, which is driven with about 30,000 rpm by the electromotor 28. The aspirated air is pumped into a hood, a special suit or an enclosure of a patient stretcher. The amount of air is determined by the certification of the filters.

Mode of Function

The cleaning device 1 is carried underneath the hood or underneath the suit. After inserting the chargeable batteries 18, the current supply is tested for full charge state and verified optically as well as acoustically. The blower 27 is automatically switched on when all filters are screwed in correctly. As soon as a filter is screwed loose, the blower 27 is switched of again. The filters are screwed in through openings on the hood or on the suit. The slidable dust flaps 7 prevent contamination of the interior of the cleaning device 1. The optical display can be placed inside the hood via an extension chord. The amount of aspirated air is determined by the maximal flow rate of the filters.

The volume flow is proportional to the pressure. By means of a pressure sensor the negative pressure is measured downstream of the filters. The pressure is also measured in the air outlet by means of a pressure sensor. The measured pressures are compared to predetermined values in a feedback control loop. In case of deviation, the rotational speed of the electromotor 28, which is constructed as asynchronous motor, is adjusted until the values correspond again. When adjustment is no lo longer possible, the user is warned optically and acoustically.

The current supply is formed by a pack of five serially connected Li ion cells each having a capacity of 3.1 Ah. With a battery management system, each individual battery 18 is monitored during the charging and discharging process. This monitoring allows maintaining the charging capacity of the batteries constant over their entire service life. A safety switch prevents that the batteries can be connected incorrectly. The pack can only be inserted into the device or into the charging station in a particular manner, i.e., it is protected against polarity reversal. The pack is charged in the charging station by way of a special charging process, which is monitored by the battery management system. The batteries 18 can remain in the charging station for extended periods of time, wherein the charging process transitions into a trickle charging.

In order to prevent contamination of the interior of the cleaning device, when the filter is not screwed in, a mechanical safety mechanism in the manner of a screw cover or the like is provided.

What is claimed is:

1. A device for filtering contaminated air, comprising:
a filter housing having a chimney-shaped sleeve;
an air filter, fastenable to the filter housing by means of a threaded connection;
an electromotor;
a battery for driving the electromotor; and
an intake fan having a guide vane and an impeller, and being arranged in the chimney-shaped sleeve, wherein the guide vane has a circular-cylindrical lateral surface and angled blades integrally formed on the circular-cylindrical lateral surface, and
the impeller has a conical outer surface and arc-shaped impeller blades integrally formed on the conical outer surface, said impeller being received in a funnel formed on the filter housing.

2. The device of claim 1, wherein an entry opening of the filter housing is provided with a flap, which is constructed for actuation by a safety pin when the air filter is screwed onto the filter housing.

3. The device of claim 2, wherein the flap is provided with a resilient closure element constructed to push the flap against the entry opening of the housing.

4. The device of claim 2, further comprising a hall-element provided on the filter housing, wherein the flap is provided with a magnet for switching the hall-element.

5. The device of claim 1, wherein the filter housing is configured cylindrical and has a base surface corresponding to a right-angled, equilateral triangle.

* * * * *